Patented July 11, 1944

2,353,164

UNITED STATES PATENT OFFICE 2,353,164

DYESTUFFS AND DYESTUFF INTERMEDIATES

John David Kendall and Douglas James Fry, Ilford, England, assignors to Ilford Limited, Ilford, England, a British company No Drawing. Application March 5, 1941, Serial No. 381,925. In Great Britain April 19, 1940

9 Claims. (Cl. 260—240)

This invention relates to the production of dyestuffs and dyestuff intermediates and particularly to the production of dyestuffs capable of optically sensitising silver halide photographic emulsions, and of dyeing textile materials, and to the production of intermediates for the manufacture of such dyestuffs.

According to the present invention dyestuffs and dyestuff intermediates are prepared by condensing together two molecules of a heterocyclic keta methylene compound of the general formula,

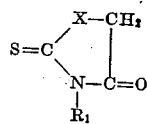

where $R_1$ is a hydrogen atom or a hydrocarbon group and X is an oxygen atom or a sulphur atom, in the presence of an anhydride or an ortho ester of a mono carboxylic acid, and in the presence of a strong base.

The base employed is preferably an organic base stronger than ammonia. Where the reaction is effected in the presence of an anhydride of a monocarboxylic acid it is important that the base (if organic) should be a tertiary base in order that it should not interact with the anhydride. A tertiary base is also preferable, though not essential, when ortho esters of monocarboxylic acids are employed.

The reaction is believed to proceed according to the following general equations:

(A) Where a monocarboxylic acid anhydride is used:

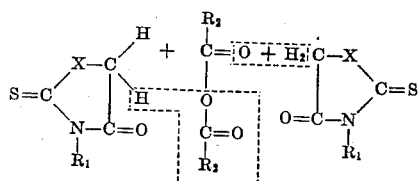

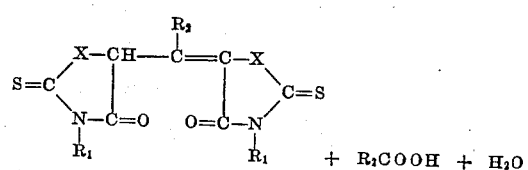

($R_2$ is a hydrocarbon group, e. g. an alkyl, aryl or aralkyl group)

(B) Where an ortho ester of a monocarboxylic acid is used:—

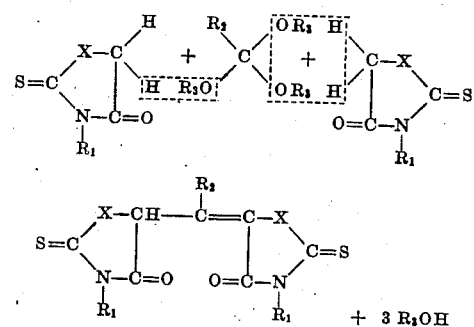

($R_3$ is a hydrocarbon group, e. g. an alkyl, aryl or aralkyl group)

It will be noted that the same general type of product is produced by the two reactions. In general the acid anhydride reagent is preferred but where a product is required in which $R_2$ is hydrogen, the reagent must be an ortho formic ester since formic acid anhydride does not exist.

The processes of this invention are of special value in forming condensation products from rhodanic acid and the N-alkyl, N-aryl and N-aralkyl derivatives of rhodanic acid, e. g. N-methyl, N-ethyl or N-higher alkyl derivatives, N-phenyl and N-naphthyl derivatives and N-benzyl and N-phenylethyl derivatives. However, it may also be applied to the condensation of 2-thio-4-keto-tetra-hydrooxazole and its N-alkyl, N-aryl and N-aralkyl derivatives.

As indicated above it is important that the reaction be carried out in the presence of a strong base, and preferably a strong tertiary base. Triethylamine has been found to be particularly suitable though other strong tertiary bases, e. g. tripropylamine, tri-isobutylamine, N-ethyl piperidine and N-isobutylpiperidine may also be employed. Inorganic bases such as potassium acetate may also be employed.

Acid anhydrides which may be used are, for example, acetic anhydride, propionic anhydride, butyric anhydride and higher homologues anhydrides, benzoic anhydride and the anhydride of phenyl acetic acid. Ortho esters of monocarboxylic acids which may be employed are, for example, the alkyl, aryl and aralkyl esters of ortho-formic acid, ortho-acetic, ortho propionic acid and higher homologous acids, ortho benzoic acid and ortho-phenylacetic acid. Preferably alkyl ortho esters are employed, e. g. ethyl esters.

The method of naming the products adopted in the following examples is to consider them as derivatives of methane, naming the group R is the "meso" group.

The invention is illustrated by the following examples:

Example 1

(2-thio-3-methyl-4-keto-tetrahydrothiazolyl-5)-(2'-thio-3'-methyl-4'-keto-tetrahydrothiazolylidene-5')-meso-methyl-methane This dyestuff was prepared by the following method: 4.5 gms. of N-methyl rhodanic acid, 4.5 ccs. of triethylamine and 17.5 ccs. of acetic anhydride were mixed together and heated on an oil bath for 1¼ hours at 115° C. The mixture was then cooled whereupon the dye crystallised out. It was filtered and washed with acetic anhydride. The addition of ether to the acetic anhydride filtrate deposited further crystals on standing overnight. The crystalline product thus obtained was recrystallised from solution in benzene and was obtained as dull purple granular crystals having a melting point of 195° C. with decomposition.

This dyestuff, incorporated in a silver iodobromide emulsion extends the sensitivity to about 6200 A. with a maximum at about 6000 A.

Example 2

(2-thio-3-ethyl-4-keto-tetrahydrothiazolyl-5)-(2'-thio-3'-ethyl-4'-keto-tetrahydrothiazolylidene-5')-meso-methyl methane This dyestuff was prepared by a method analogous to that of Example 1 employing 4.8 gms. of N-ethyl rhodanic acid instead of the N-methyl rhodanic acid. The product was obtained as crystals melting at 156° C. with decomposition. This dyestuff, incorporated in a silver iodobromide emulsion extends the sensitivity to about 6200 A. with a maximum at about 6000 A.

Example 3

(2-thio-3-methyl-4-keto-tetrahydrothiazolyl-5)-(2'-thio-3'-methyl-4'-keto-tetrahydrothiazolylidene-5')-methane This dyestuff was prepared by the following method: 4.5 gms. of N-methyl rhodanic acid, 10.5 ccs. of ethyl orthoformate and 4.5 ccs. of triethylamine were mixed together and heated on an oil bath for one hour at 115° C. A solid separated from the cooled mixture. The liquid was decanted and the residue boiled with 70 ccs. of ethyl alcohol and filtered hot. The product was thus obtained as greenish-blue crystals. On purifying by boiling out with benzene, the product was obtained, as crystals, having a melting point of 230° C. with decomposition.

Example 4

(2-thio-3-ethyl-4-keto-tetrahydrothiazolyl-5)-(2'-thio-3'-ethyl-4'-keto-tetrahydrothiazolylidine-5')-methane This dyestuff was prepared by a method analogous to that of Example 3 employing 4.8 gms. of N-ethyl rhodanic acid instead of the N-methyl rhodanic acid. The product was obtained as blue needles melting at 163° C. with decomposition. This dyestuff incorporated in a silver iodo-bromide emulsion, extends the sensitivity to about 6200 A.

Example 5

(2-thio-3-methyl-4-keto-tetrahydrothiazolyl-5)-(2'-thio-3'-methyl-4'-keto-tetrahydrothiazolylidine-5')-meso-ethyl-methane This dyestuff was prepared by the following method: 3 gms. of N-methyl rhodanic acid, 15 ccs. of propionic anhydride and 3 ccs. of triethylamine were mixed together and heated on an oil bath at 115° C. for 1¼ hours. The mixture was then cooled, ether was added and the mixture filtered. The dye was thus obtained as a crystalline product which on recrystallisation from benzene solution, had a melting point of 193° C. with decomposition.

As already indicated, the dyestuffs of the present invention are sensitising dyestuffs for gelatine silver halide photographic emulsions, e. g. silver chloride, silver bromide, silver chlorobromide and silver iodobromide emulsions. The dyestuffs are also valuable intermediates for the production of other dyestuffs as described in co-pending application No. 381,926 filed on even date herewith.

The dystuffs of this application, in addition to their value as photographic sensitising dyes, are also of value as textile dyestuffs, e. g. for cellulose acetate artificial silk. Dye baths formed from them may be simple solutions of the dyestuffs in water where the dyestuffs are sufficiently soluble. Where the dyestuffs are relatively insoluble they may be employed in the form of dispersions in any of the well known dispersing agents commonly employed in forming dye-baths for cellulose acetate silk, e. g. Turkey red oil, sulpho-ricinoleic acid, naphthenic acids, sulphonated naphthenic acids, sulphonated naphthalene-formaldehyde condensation products, sulphonated long chain fatty alcohols and similar agents.

The following are examples of the use of the dyestuffs in this connection (the parts referred to are parts by weight).

Example 6

4 parts of the dyestuff of Example 4 were ground to a paste with a little water and then added to an aqueous solution of 25 parts of Perminal W (an alkylated naphthalene sulphonic acid). The volume of the solution was adjusted to a total of 2,550 parts by the addition of further water. 85 parts of cellulose acetate fabric were then immersed in the solution and the solution heated to 80° C. for 30 minutes. The fabric was then removed, washed and dried. It was dyed a rich cerise-red shade.

Example 7

The procedure indicated in Example 6 was followed, using 5 parts of the dyestuff of Example 5 and 30 parts of Ultravon W, making the total bulk to 3,300 parts and dyeing, by means of this bath, 110 parts of cellulose acetate fabric. The fabric was dyed a cerise-red shade.

Example 8

3 parts of the dyestuff of Example 2 were ground to a paste with a little water and then dissolved in 3,000 parts of hot water. 75 parts of cellulose acetate fabric were immersed in the resulting bath and heated for 30 minutes at 80° C. The fabric was thus dyed a rose-red shade.

What we claim is:

1. Process for the manufacture of symmetrical dyestuffs and dyestuff intermediates having two heterocyclic ketomethylene nuclei linked to another which comprises condensing together two molecular equivalents of a heterocyclic ketomethylene compound of the general formula:

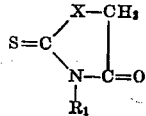

where X is an atom selected from the group consisting of oxygen and sulphur atoms and $R_1$ is selected from the group consisting of the hydrogen atom and hydrocarbon groups as the sole type of reactive heterocyclic nitrogen compound in the reaction zone, in the presence of a strong base and a compound selected from the group consisting of anhydrides and ortho-esters of mono-carboxylic acids.

2. Process for the manufacture of symmetrical dyestuffs and dyestuff intermediates which having two rhodanine nuclei linked to one another comprises condensing together two molecular equivalents of an N-hydrocarbon-substituted rhodanic acid as the sole type of reactive heterocyclic nitrogen compound in the reaction zone in the presence of a strong base and a compound selected from the group consisting of anhydrides and ortho-esters of mono-carboxylic acids.

3. Process for the manufacture of symmetrical dyestuffs and dyestuff intermediates which having two rhodanine nuclei linked to one another comprises condensing together two molecular equivalents of an N-hydrocarbon-substituted rhodanic acid as the sole type of reactive heterocyclic nitrogen compound in the reaction zone in the presence of triethylamine and a compound selected from the group consisting of anhydrides and ortho-esters of mono-carboxylic acids.

4. Process for the manufacture of symmetrical dyestuffs and dyestuff intermediates which having two rhodanine nuclei linked to one another comprises condensing together two molecular equivalents of an N-hydrocarbon-substituted rhodanic acid as the sole type of reactive heterocyclic nitrogen compound in the reaction zone in the presence of a strong organic tertiary base and an anhydride of a lower fatty acid.

5. A dyestuff of the general formula:

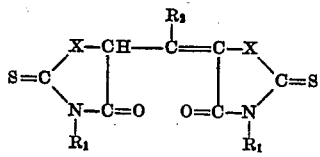

where X is an atom selected from the group consisting of oxygen and sulphur atoms and $R_1$ is selected from the group consisting of hydrogen atoms and hydrocarbon groups and $R_2$ is a hydrocarbon radical.

6. A dyestuff of the general formula

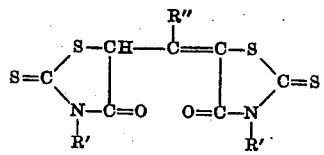

wherein R' and R'' are hydrocarbon radicals.

7. (2-thio-3-methyl-4-keto tetrahydrothiazolyl-5)-(2'-thio-3'-methyl-4'-keto-tetrahydrothiazolylidene-5')-meso-methyl-methane of the formula:

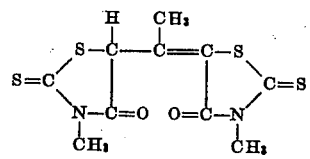

8. (2-thio-3-ethyl-4-keto-tetrahydrothiazolyl-5)-(2'-thio-3'-ethyl-4'-keto-tetrahydrothiazolylidene-5')-meso-methyl methane of the formula:

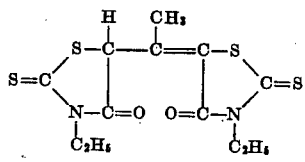

9. (2-thio-3-methyl-4-keto-tetrahydrothiazolyl-5)-(2'-thio-3'-methyl-4'-keto-tetrahydrothiazolylidene-5')-meso-ethyl methane of the formula:

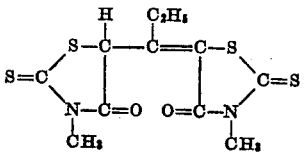

JOHN DAVID KENDALL.
DOUGLAS JAMES FRY.